United States Patent [19]

Gotoh et al.

[11] Patent Number: 5,034,280

[45] Date of Patent: Jul. 23, 1991

[54] ELECTROSTATIC RECORDING FILM

[75] Inventors: Hidenori Gotoh; Takeshi Konno, both of Shizuoka, Japan

[73] Assignee: Fuji Photo Film Co., Ltd., Kanagawa, Japan

[21] Appl. No.: 427,396

[22] Filed: Oct. 27, 1989

[30] Foreign Application Priority Data

Oct. 28, 1988 [JP] Japan ................................ 63-272138

[51] Int. Cl.$^5$ ................................................ B32B 9/00

[52] U.S. Cl. .................................... 428/513; 428/195; 428/537.5; 346/135.1

[58] Field of Search ............... 428/195, 206, 207, 211, 428/513, 537.5; 346/135.1; 427/121

[56] References Cited

U.S. PATENT DOCUMENTS 4,792,485 12/1988 Konno ................................ 428/327

FOREIGN PATENT DOCUMENTS 136049 6/1988 Japan .

1254965 10/1989 Japan .

2166370 5/1986 United Kingdom .

*Primary Examiner*—Patrick J. Ryan

*Attorney, Agent, or Firm*—Sughrue, Mion, Zinn, Macpeak & Seas

[57] ABSTRACT

An electrostatic recording film formed by laminating an insulating film with an electroconductive layer and a dielectric layer, respectively, in which the dielectric layer contains a combination of high polymer binders comprising (A) at least one polymer selected from halogenated polyolefins, polymers of halogenated olefins and copolymers of halogenated olefins and (B) at least one polyester, the weight ratio of (A)/(B) being from 2/98 to 20/80. The film gives a high quality image in rapid recording, even after stored for a long period of time, and the image fixability of the film is excellent.

7 Claims, No Drawings

ELECTROSTATIC RECORDING FILM

FIELD OF THE INVENTION

The present invention relates to an electrostatic recording film and, in particular, to such a film where an electric signal is directly converted into an electrostatic latent image and the image is developed with a toner to give a visible image. More precisely, it relates to an electrostatic recording film which can be used in an electrostatic recording printer or plotter for CAD (computer aided design interactive plan system).

BACKGROUND OF THE INVENTION

An electrostatic recording film formed by laminating an insulating film with an electroconductive layer and a dielectric layer, respectively, is known.

In general, in an electrostatic recording system used in an electrostatic recording plotter for CAD, a recording voltage is applied to a multi-pin electrode head (hereinafter referred to as "pin electrode") to cause an aerial discharge in the narrow space (hereinafter referred to as "gap") between the pin electrode and the dielectric layer of the electrostatic recording film thereby to form an electrostatic latent image on the surface of the dielectric layer, and thereafter the latent image thus formed is developed with a liquid toner to give a visible image and this is then fixed as it is. In order to reproducibly obtain an image by the process, it is necessary that the gap is controlled to be in a predetermined range from Paschen's curve. For this, for example, a system where insulating grains are added so as to make the surface of the dielectric layer suitably rough, and the layer is brought into contact with the pin electrode, the surface roughness properly controlling the gap, is employed most generally. On the other hand, the fixation of the toner image on the electrostatic recording materials is effected by allowing (or drying) the image to stand as it is without the aid of heat or pressure in the conventional process. Therefore, in the case of using a paper support, a liquid toner permeates into the support, and whereby good fixability is obtained by merely air-drying, whereas in the case of using a polymer film support, since such permeation of a liquid toner into the support is hardly caused, sufficient fixability could not be obtained. Accordingly, there is a drawback that the toner image is easily peeled off from the dielectric layer when touched or rubbed with hands.

The electrostatic recording film is characterized by the desirable characteristics of recording stability, transparency, dimensional stability, strength, dust-repelling property and storage stability, as compared with the conventional electrostatic recording papers, and therefore the development of the film is desired. However, a recording film that gives a high quality image reliably in rapid recording and additionally has a sufficient image fixability is hardly obtained, which has heretofore been a great bar to the practical use of the film.

As a means of improving the fixability of the toner image, a recently published patent application mentions that a mixture of (A) at least one polymer selected from halogenated polyolefins containing from 60 to 80% by weight of halogen and (B) at least one polymer selected from polyester copolymers having Tg of 20° C. or lower and/or poly(meth)acrylate copolymers having Tg of 20° C. or lower are added to the dielectric layer as a combination of high polymer binders, the weight ratio of (A)/(B) being from 98/2 to 50/50 (JP-A-63-184758) (the term "JP-A" as used herein refers to a "published unexamined Japanese patent application").

In accordance with the method, the fixability against release (as measured by applying and then peeling off a strip of mending tape) could surely be improved, but the fixability against scratch, e.g., with nails, could not be further improved. Accordingly, the film obtainable by the method could not be employed for drawings for CAD which are desired to be accurate.

The present inventors earnestly investigated and studied the problem of improvement of the fixability of the toner image to be formed on an electrostatic recording film with a liquid toner and, as a result, they have found a combination of high polymer binders which is effective for improving not only the fixability against release but also the fixability against scratching and accordingly they have achieved the present invention.

SUMMARY OF THE INVENTION

The object of the present invention is to overcome the problems in the above-mentioned prior art and to provide an electrostatic recording film which stably gives a high quality image even in rapid recording and which has an excellent image fixability even after storage for a long period of time.

In order to attain the object, the present invention provides an electrostatic recording film formed by laminating an insulating film with an electroconductive layer and a dielectric layer, respectively, in which the dielectric layer contains a combination of high polymer binders comprising (A) at least one polymer selected from halogenated polyolefins, polymers of halogenated olefins and copolymers of halogenated olefins and (B) at least one polyester, the weight ratio of (A)/(B) being from 2/98 to 20/80.

DETAILED DESCRIPTION OF THE INVENTION

As the characteristic aspect of the present invention, the dielectric layer constituting the electrostatic recording film of the present invention contains a combination of high polymer binders comprising (A) at least one polymer selected from halogenated polyolefins, polymers of halogenated olefins and copolymers of halogenated olefins and (B) at least one polyester, and the weight ratio of (A)/(B) is from 2/98 to 20/80.

As the high polymer binder to be employed in forming the dielectric layer of the film of the present invention, resins having a volume electric resistance of $10^{12}\Omega\cdot$cm or more are preferred.

The halogenated polyolefins for use in the present invention are those prepared by halogenating polyolefins, which include, for example, the following compounds:

(a) Halogenated polyethylenes and copolymers thereof (b) Halogenated polypropylenes and copolymers thereof (c) Halogenated polybutylenes and copolymers thereof (d) Halogenated polyisobutylenes and copolymers thereof Above all, those having a halogen content of from 60 to 80% by weight on the basis of the polymer composition are preferred. These compounds can be used as a mixture of two or more of them.

The halogenated polyolefins can be prepared by known methods as described, for example, in *Polymer Journal*, Vol. 7, No. 3, pp. 287-299 (1975). For instance, a polyolefin is dissolved in a halogen solvent and halogenated under heat and under pressure or at normal pressure, and thereafter the thus halogenated polymer is subjected to the steps of distillation, washing and drying to obtain the intended product. As the halogenated polyolefins, those containing a small amount of impurities such as halogen molecules, hydrogen halides and other halogen compounds are preferred. The halogenated polyolefins may contain, if desired, known stabilizers, antioxidants, ultraviolet absorbents and other additives within the range not interfering with the characteristic of the present invention. Of the halogenated polyolefins, chlorinated polyolefin is most preferably employed in view of the easy preparation thereof.

As the polyesters for use in the present invention, any of those known in the field can be employed, and those having a glass transition temperature (Tg) of 0° C. or higher are preferred. More preferably, those having Tg of 20° C. or higher are employed. The term "glass transition temperature" used herein means a temperature at which a viscoelasticity of a polymer is rapidly changed as described, for example, in *Kagaku DaiJiten* (*Chemical Encyclopedia*), published by Kyowa Shuppan K.K., Vol. 2, pp. 523-524 (1987). Such polyesters to be used in the present invention can be obtained by copolymerization of a polycarboxylic acid and polyalcohol. As the polycarboxylic acid, there are preferably mentioned terephthalic acid, isophthalic acid, phthalic acid, 2,6-naphthalenedicarboxylic acid, diphenylcarboxylic acid, succinic acid, adipic acid, azelaic acid, sebacic acid, dodecanedicarboxylic acid, 1,4-cyclohexanedicarboxylic acid and trimellitic anhydride. As the polyalcohol, there are preferably mentioned ethylene glycol, 1,4-butanediol, 1,5-pentanediol, 1,6-hexanediol, diethylene glycol, triethylene glycol, polyethylene glycol, polytetramethylene glycol, propylene glycol, neopentyl glycol, 1,4-cyclohexanedimethanol, pentaerythritol and trimethylolpropane. More preferred are linear polyesters which are copolymers of dicarboxylic acids and dialcohols.

As the polymers of halogenated olefins for use in the present invention, polymers of vinyl halides, polymers of vinylidene halides, polymers of allyl halides and polymers of methallyl halides are preferred. Further, copolymers containing two or more of them and mixtures thereof are also preferred. In addition, copolymers composed of at least one of halogenated olefins and at least one selected from acrylonitrile, acrylates, methacrylates, olefins, acrylamide, itaconic acid, maleic anhydride, vinyl acetate or vinyl ethers as well as mixtures thereof are also preferred.

Of the polymers of halogenated olefins, polymers of chlorinated olefins such as polyvinyl chloride, polyvinylidene chloride, polyallyl chloride and polymethallyl chloride are more preferred.

It is preferred that the component (A) has a molecular weight of about 5,000 to 250,000 and the component (B) has a molecular weight of about 2,500 to 30,000.

The weight ratio of (A)/(B) is required to be from 2/98 to 20/80, and the components (A) and (B) are properly selected from the said range. More preferably, the ratio of (A)/(B) is from 5/95 to 15/85. If the weight ratio of (A) is more than the limit, a sharp image could not be obtained in printing the film when the film is stored for a long period of time. If, on the other hand, it is less than the limit, the fixability against scratching would worsen.

The dielectric layer constituting the film of the present invention may contain, if desired, a known high polymer binder, plasticizer, adhesion accelerator, stabilizer, antioxidant, ultraviolet absorbent and lubricant, within the range not interfering with the characteristic of the intended electrostatic recording film. In addition, an electroconductive powder may also be added to the layer, if desired, for the purpose of preventing fogging. A known high polymer binder may be added to the layer in an amount of 20 parts by weight or less based on 100 parts by weight of the combination of the high polymer binders of the present invention.

As insulating grains, generally known inorganic grains and/or organic grains having a volume intrinsic resistance of $10^8$ ω·cm or more, preferably $10^{10}$ ω·cm or more, may be employed. The inorganic grains may be selected from grains of metal oxides such as silicon oxide, titanium oxide, alumina, lead oxide or zirconium oxide, as well as grains of salts such as calcium carbonate, barium titanate or barium sulfate. The organic grains may be selected from grains of polyolefins such as polyethylene or polypropylene as well as from grains of starch, styrene-divinylbenzene copolymer, melamine resin, epoxy resin, phenol resin or fluorine resin. These insulating grains may be composed of a single substance or of a mixture of two or more substances. The mean grain size of the insulating grains is required to be such that may form projections on the surface of the dielectric layer to insure discharge stability, and it therefore depends upon the thickness of the film. In general, the mean grain size may properly be selected from the range of from 4 to 20 μm. The weight ratio of the high molecular binders to the insulating grains is preferably within the range of from 100/0.5 to 100/100. If it is less than the limit, the discharge stability would be poor, but if it is more than the same, the transparency of the film would disadvantageously be lost.

The thickness of the dielectric layer is preferably from 1 to 20 μm.

The dielectric layer may be composed of a single layer or a plurality of laminated layers.

For instance, the dielectric layer containing the combination of the high polymer binders of the present invention may be laminated on a dielectric layer containing generally known binder and grains. In the case, the layer containing the combination of the high polymer binders of the present invention may be one containing no insulating grains.

As a concrete means of forming the dielectric layer, a dielectric high polymer binder is dissolved or dispersed in a pertinent solvent or water, insulating grains or a dispersion thereof are(is) added to the resulting solution or dispersion and stirred in a ball mill or the like, and the resulting blend is coated on a film base and dried thereon by a known method to give the thickness mentioned above.

The insulating film to be employed in the present invention may be a film made of a known thermoplastic resin or thermosetting resin. As the resins for the film, there are preferably mentioned polyesters, polyolefins, polyamides, polyesteramides, polyethers, polyimides, polyamidimides, polystyrenes, polycarbonates, poly-p-phenylenesulfides, polyether-esters, polyvinyl chloride and poly(meth)acrylates.

In addition, copolymers of the compounds as well as blends thereof and crosslinked products thereof may also be employed. The resins are preferably stretched to improve mechanical strength, dimensional stability, thermal property and optical property. Among them, polyesters are most preferred. The polyesters indicate those composed of an aromatic dicarboxylic acid as the main acid component and an alkylene glycol as the main glycol component.

As specific examples of the aromatic dicarboxylic acid, there are mentioned terephthalic acid, isophthalic acid, naphthalenedicarboxylic acid, diphenoxyethanedicarboxylic acid, diphenyldicarboxylic acid, diphenyl ether-dicarboxylic acid, diphenylsulfone-dicarboxylic acid, diphenyl ketone-dicarboxylic acid, anthracene-dicarboxylic acid and $\alpha,\beta$-bis(2-chlorophenoxy)ethane-4, 4'-dicarboxylic acid. Among them, terephthalic acid is especially preferred.

As specific examples of the alkylene glycol, there are mentioned ethylene glycol, trimethylene glycol, tetramethylene glycol, pentamethylene glycol, hexamethylene glycol and hexylene glycol.

Needless to say, the polyesters may be either homopolyesters or copolyesters. As the comonomer components, there are mentioned, for example, diol components such as diethylene glycol, propylene glycol, neopentyl glycol, polyalkylene glycol, p-xylylene glycol, 1,4-cyclohexane-dimethanol and 5-sodium sulforesorcinol, dicarboxylic acid components such as adipic acid, sebacic acid, phthalic acid, isophthalic acid, 2,6-naphthalene-dicarboxylic acid and 5-sodium sulfoisophthalic acid, polyfunctional dicarboxylic acids such as trimellitic acid and pyromellitic acid, and hydroxycarboxylic acid components such as p-hydroxyethoxybenzoic acid.

The thickness of the insulating film is preferably from 10 $\mu$m to 250 $\mu$m, more preferably from 15 $\mu$m to 150 $\mu$m. If the film is thinner than the limit, the mechanical strength would be insufficient, but if it is thicker than the same, the film-feeding property would be unfavorably poor.

The insulating film may optionally be surface-treated by conventional means, for example, by corona discharge treatment, plasma discharge treatment or anchor coating, for the purpose of improving the adhesiveness of the film.

In addition, the insulating film preferably has a static friction factor of 2.0 or less, more preferably 1.0 or less, for the purpose of preventing formation of scratches during running.

In the present invention, the volume intrinsic resistance of the plastic film is not specifically limited but may properly be selected in accordance with the electrostatic recording system to be employed.

For instance, an antistatic agent or an electroconductive layer may be coated or provided on the surface of the insulating film opposite to that coated with the electroconductive layer, or an antistatic agent is incorporated on the insulating film, for the purpose of preventing generation of static electricity on the surface of the insulating film opposite to the electroconductive layer-coated surface, provided that such agent or layer does not interfere with the characteristics of the electrostatic recording film of the present invention, whereby the obverse surface and the reverse surface of the insulating film may be electroconductively connected to each other. The insulating film of such type may also be employed in the present invention, in addition to the above-mentioned insulating film.

In addition, a mat agent-coated film or a colored film may also be employed, if desired. Further, a laminate prepared by laminating two or more insulating films may also be employed.

As the electroconductive layer for use in the present invention, any of those known in the field may be referred to. It is preferred that the layer has a surface electrical resistivity of from $10^1$ to $10^9$ $\Omega/\square$. As specific examples of such electroconductive layer, there are mentioned (1) a layer containing an electron-conductive metal or metal oxide, (2) a layer formed by coating an ion-conductive high polymer electrolyte, and (3) a layer containing an electroconductive powder and a high polymer binder or high polymer electrolyte.

As the electrostatic recording media, those described, for example, in *National Technical Report*, Vol. 25, No. 5, October (1979) may be used in the present invention.

In the electrostatic recording film of the present invention, a carbon electrode or the like may optionally be provided to the edge of the dielectric layer, as well known in this technical field, as a means of preventing generation of a so-called fog or ghost.

As explained in detail in the above, the electrostatic recording film of the present invention comprises an insulating film laminated with an electroconductive layer and a dielectric layer respectively, in which the dielectric layer contains a combination of particularly high polymer binders. Accordingly, the film may stably give a high quality image in rapid recording even after stored for a long period of time, and additionally the film has an excellent image fixability.

Since the electrostatic recording film of the present invention has excellent characteristics as mentioned above, it may be applied to electrostatic recording printer-plotter or facsimile especially as an electrostatic recording film for hard copy.

The image fixability as referred to herein is measured by the methods mentioned below.

(1) Measuring Method by Release of Tape

The image density (initial density) of the solid black image region was measured and then a mending tape (Scotch ®, a magic transparent tape, manufactured by Sumitomo 3M, i.e., a drawing-mending tape wherein surface opposite to the adhesive surface is matted so as to be capable of writing by pencil) was attached thereto. Next, the tape was peeled off therefrom with an angle of 180°, and the image density (residual density) of the peeled part was measured. Where the fixed percentage was 60% or more, the sample was evaluated to be good, but where the fixed percentage was less than 60%, the sample was evaluated to be bad (not good).

$$\text{Fixed Percentage} = \frac{\text{Residual Density}}{\text{Initial Density}} \times 100(\%)$$

(2) Measuring Method by Scratching

The solid black image region was scratched with a continuous load-type scratching hardness tester, and the samples were evaluated on the basis of the four ranks of (A) (best) to (D) (worst) for the image fixability as follows.

$$\text{Degree of Image Fixability} = \frac{\text{The total length of the parts not peeled off when continuously scratched by a needle (load: 100 g)}}{\text{The length of scratched part}} \times 100$$

A: more than 60%

B: 40% to 60%
C: 20% to 40%
D: less than 20%

The following examples are intended to illustrate the present invention in more detail but not to limit it in any way.

EXAMPLE 1

An aqueous dispersion containing $SnO_2$ (Sb-doped) grains having a mean grain size of 0.15 μm and gelatin in a weight ratio of 3/1 was coated on a 75 μm thick biaxially stretched polyethylene terephthalate film in a dry thickness of 0.2 μm, to obtain an electroconductive film having a surface electrical resistivity of $5\times10^6$ Ω/□.

On the electroconductive film thus prepared was coated a dielectric layer-coating composition comprising the components mentioned below, which was then dried at 100° C. for 10 minutes to form a dielectric layer of 2.1 μm. Further, carbon electrodes of 100 K Ω/10 cm were provided to the both edges of the dielectric layer to obtain an electrostatic recording film of the present invention.

An image was recorded on the film with an electrostatic plotter having 16/mm of multi-pin electrodes (CE 3424, manufactured by VERSATEC Co.) using toners mentioned below, and the degree of the fixation of the image on the film was determined by the tape-releasing method and scratching method. The result was "good" and "A (68%)", respectively.

In addition, the electrostatic recording film thus prepared was stored for one year (25° C., 65% RH) and then recorded in the same manner. As a result, a sharp image was obtained.

Dielectric Layer-Coating Composition

| | |
|---|---|
| Toluene | 180 g |
| MEK | 78 g |
| Polyester (Uylon 200; Tg = 67° C., manufactured by Toyo Spinning Co.) | 34 g |
| Chlorinated Polyethylene (SUPERCHLON 917 LTA; Cl content: 68%; manufactured by Sanyo Kokusaku Pulp Co.) | 4 g |
| Ester Gum AA-L (manufactured by Arakawa Chemical Industry) | 2 g |
| Polypropylene Grain Dispersion (20%) (insulating grains, UNISTOLE R100K; mean grain size, 8.6 μm, manufactured by Mitsui Petrochemical Co.) | 2 g |

Toners

Yellow toner (CE-Yellow Premix No. 4862-1-1, manufactured by VERSATEC Co.), wherein yellow dye was mixed with methacrylate copolymer, then powdered, and finally dispersed in isoparaffin.

Magenta toner (CE-Magenta Premix No. 4863-1-1, manufactured by VERSATEC Co.), wherein magenta dye was mixed with methacrylate copolymer, then powdered, and finally dispersed in isoparaffin.

Cyan toner (CE-Cyan Premix No. 4864-1-1, manufactured by VERSATEC Co.), wherein cyan dye was mixed with methacrylate copolymer, then powdered, and finally dispersed in isoparaffin.

Black toner (CE-Process Black No. 4861-1-1, manufactured by VERSATEC Co.), wherein carbon black was mixed with methacrylate copolymer, then powdered, and finally dispersed in isoparaffin.

EXAMPLES 2 TO 4

The same process as in Example 1 was repeated except that chlorinated polypropylene (SUPERCHLON 406, manufactured by Sanyo Kokusaku Pulp Co.), polyvinyl chloride (Zeon 25, manufactured by Nippon Zeon Co.) or polyvinylidene chloride (Saran F-310, manufactured by Asahi Chemical Co.) was used in place of the chlorinated polyethylene in Example 1. The same results were obtained. In the image fixability determined by the scratching method, the results of Examples 2 to 4 were "A (64%)", "A (65%)" and "A (69%)", respectively.

COMPARATIVE EXAMPLE 1

The same process as in Example 1 was repeated except that the amount of the chlorinated polyethylene and that of the polyester were changed to 0.3 g and 37.7 g, respectively. As a result, the tape-peeling test indicated "good", while the scratching test indicated "D (18%)". After the electrostatic recording film obtained was stored for one year and then printed, a sharp image was obtained.

COMPARATIVE EXAMPLE 2

The same process as in Example 1 was repeated except that the amount of the chlorinated polyethylene and that of the polyester were changed to 24 g and 24 g, respectively. As a result, the tape-peeling test indicated "good" and the scratching test indicated "A (72%)". However, after the electrostatic recording film obtained was stored for one year and then printed, the image density was noted lower than that obtained in the corresponding fresh film.

While the invention has been described in detail and with reference to specific embodiments thereof, it will be apparent to one skilled in the art that various changes and modifications can be made therein without departing from the spirit and scope thereof.

What is claimed is:

1. An electrostatic recording film formed by laminating an insulating film with an electroconductive layer and a dielectric layer, respectively, in which said dielectric layer contains a combination of high polymer binders comprising (A) at least one polymer selected from halogenated polyolefins, polymers of halogenated olefins and copolymers of halogenated olefins and (B) at least one polyester, the weight ratio of (A)/(B) being from 2/98 to 20/80.

2. An electrostatic recording film as in claim 1, in which said halogenated polyolefins, polymers of halogenated olefins and copolymers of halogenated olefins are chlorinated polyolefins, polymers of chlorinated olefins and copolymers of chlorinated olefins, respectively.

3. An electrostatic recording film as in claim 1, in which the polyesters are those having a Tg of 0° C. or higher.

4. An electrostatic recording film as in claim 3, in which the polyesters are those having a Tg of 20° C. or higher.

5. An electrostatic recording film as in claim 1, in which the polyesters are those prepared by copolymerization of polycarboxylic acids and polyalcohols.

6. An electrostatic recording film as in claim 5, in which the polyesters are those prepared by copolymerization of dicarboxylic acids and dialcohols.

7. An electrostatic recording film as in claim 1, in which the weight ratio of (A)/(B) is from 5/95 to 15/85.

* * * * *